United States Patent [19]

Duwelz

[11] Patent Number: 4,500,057
[45] Date of Patent: Feb. 19, 1985

[54] MECHANISM FOR DOCKING AND JOINING SPACE CRAFT

[75] Inventor: Alain J. Duwelz, Mantes-la-Ville, France

[73] Assignee: Societe Nationale Industrielle Aerospatiale, France

[21] Appl. No.: 502,193

[22] Filed: Jun. 8, 1983

[30] Foreign Application Priority Data

Jun. 15, 1982 [FR] France ................. 82 10446

[51] Int. Cl.³ ............................................. B64G 1/64
[52] U.S. Cl. ..................................... 244/161; 244/115
[58] Field of Search ................. 244/135 A, 161, 115, 244/116; 114/250, 249

[56] References Cited

U.S. PATENT DOCUMENTS

| | | | |
|---|---|---|---|
| 3,201,065 | 8/1965 | Dunn | 244/161 |
| 3,262,654 | 7/1966 | Kaemper | 244/161 |
| 3,910,533 | 10/1975 | Cheatham | 244/161 |
| 4,177,964 | 12/1979 | Hujsak et al. | 244/161 |
| 4,195,804 | 4/1980 | Hujsak et al. | 244/161 |
| 4,381,092 | 4/1983 | Barker | 114/250 |

*Primary Examiner*—Galen L. Barefoot
*Attorney, Agent, or Firm*—Marshall, O'Toole, Gerstein, Murray & Bicknell

[57] ABSTRACT

The present invention relates to a mechanism for docking and joining space craft, whereby one craft may be captured by remote control then hauled in towards the other, to which it is then joined. According to the invention, this mechanism is characterized in that it comprises, mounted on the captor craft, a steerable, extensible and retractable boom provided at its free end with connecting means adapted to cooperate with complementary connecting means provided on the craft to be captured.

4 Claims, 8 Drawing Figures

MECHANISM FOR DOCKING AND JOINING SPACE CRAFT

The present invention relates to a mechanism for docking and joining space craft.

Certain space missions are known to include rendezvous between space craft with at least temporary connection between said craft, for example to allow a load to be transferred from one to the other. It is therefore necessary in such a case to equip said craft with a docking and joining mechanism allowing such a connection.

In the event of at least one of the space craft comprising a structure of large dimensions and of low rigidity mounted in overhang with respect to its body, for example solar generators constituted by a plurality of unfurled panels, it is obviously necessary that docking between the two craft be effected at a relative velocity which is as low as possible, so that there is no shock sufficiently great to risk said structure of low rigidity vibrating and possibly deteriorating.

One solution to this problem, for example described in U.S. Pat. No. 3,201,065, consists in organizing the remote-controlled capture of one of the space vehicles by the other, then in hauling in the captured vehicle until the two vehicles come into contact and join.

In this U.S. Pat. No. 3,201,065, remote-controlled capture is ensured by a drone launched from one of the vehicles and fixed to the end of a line or cable which it unwinds, said drone being introduced and locked in an appropriate housing provided in the other vehicle, after which docking is effected by pulling on said cable.

However, such a solution employing a drone can only be used in the event of at least one of said vehicles being manned, since the drone must be remotely controlled, and in sight, from one of said vehicles in order to be introduced into the special housing provided on the other vehicle.

It is an object of the present invention to provide a mechanism for docking and joining spacecraft, employing, as in U.S. Pat. No. 3,201,065, the remote-controlled capture then hauling in of one of the craft with respect to the other, but adapted to be used for docking and joining automatic, unmanned space craft.

To this end, according to the invention, the docking and joining mechanism for space craft, due to which one of said craft may be captured by remote control then hauled in towards the other and subsequently joined thereto, is noteworthy in that it comprises, mounted on the captor craft, a steerable, extensible and retractable boom, provided at its free end with connecting means adapted to cooperate with complementary connecting means provided on the craft to be captured.

When the two craft are sufficiently close to each other, the boom may be extended towards said complementary connecting means of the craft to be captured until the connecting means that it bears cooperate therewith, then said boom is retracted to haul in the captured craft towards the captor craft, with a view to docking. It will be readily appreciated that, due to the different information concerning relative position and velocity of the two craft, and due to the different information given by appropriate sensors and concerning the position of the connecting means of the boom with respect to those of the craft to be captured, it is possible to effect capture and hauling in of the captured craft automatically.

In an advantageous embodiment, the boom is constituted by a tubular structure made from windable and unwindable, supple, e.g. metallic bands generally designated as STEM structure (Storable Tubular Extendible Member). Examples of such storable tubular extendible members are for example given in U.S. Pat. No. 3,213,573, in the Journal LUFTFAHRTTECHNIK RAUMFAHRTTECHNIK, Volume 14, No. 1, January 1968, pages 1 to 6 and in the publication "The BI-STEM—A New Technique in Unfurlable Structures" No. 18, May 4, 1967, of the Canadian firm SPAR Aerospace Products Ltd. When the boom is formed by such a structure, it is advantageous to provide it with a winch whose cable is fixed to the free end of the boom. In this way, the hauling effort may be supported by the cable, whilst it is the winch which controls hauling in. Moreover, when the two craft separate, the cable may serve to control the separating operation.

The base of the boom is preferably mounted on a plate connected to the craft by an articulation equivalent to a ball and socket joint disposed at its centre and adapted to pivot about this articulation under the action of actuators. Moreover, the boom, the connecting means and the complementary connecting means are adapted to enable the craft to be taken to the same electrical potential as soon as said means begin to cooperate.

The mechanism according to the invention further comprises means of the cone and sphere type for centering the two craft with respect to each other during hauling in, means of the damper and bearing surface type for damping the contact of the two craft and means for locking the two craft upon contact, the means of each of the types comprising elements mounted on one of the craft and elements mounted on the other craft. Part of these centering means may be formed by the end of an open envelope laterally surrounding the plate and its articulation and traversed by said boom, when the latter is in extended state, whilst the bearing surface of the damping means may be formed by the flange provided at the end of an open envelope surrounding the complementary connecting means.

In this case, part of the locking means is borne by said flange.

It is advantageous if at least one of the elements of the centering means is supported elastically.

In order to guide the connecting means towards the complementary connecting means with precision, proximity sensors are mounted inside the envelope surrounding the complementary connecting means to detect the free end of the boom. To complete cooperation thereof, the connecting means and the complementary connecting means comprise means for centering with respect to one another.

To be certain of being able to separate the two craft at the end of the mission, the elements of the mechanism provided on one of the craft are mounted thereon via a pyrotechnic separating device.

The connecting means and the complementary connecting means and/or the locking means preferably comprise electrically controlled magnetic locks.

Furthermore, to avoid the problems of a front plug-in, the mechanism advantageously comprises means for electrical connection between the two craft by lateral plug-in of the connectors.

The invention will be more readily understood on reading the following description with reference to the accompanying drawings, in which:

FIGS. 1 to 4 schematically illustrate the mechanism according to the invention and the manoeuvres of capture, docking and separation of two space craft equipped with this mechanism.

In these Figures, identical references designate like elements.

Figure 1:
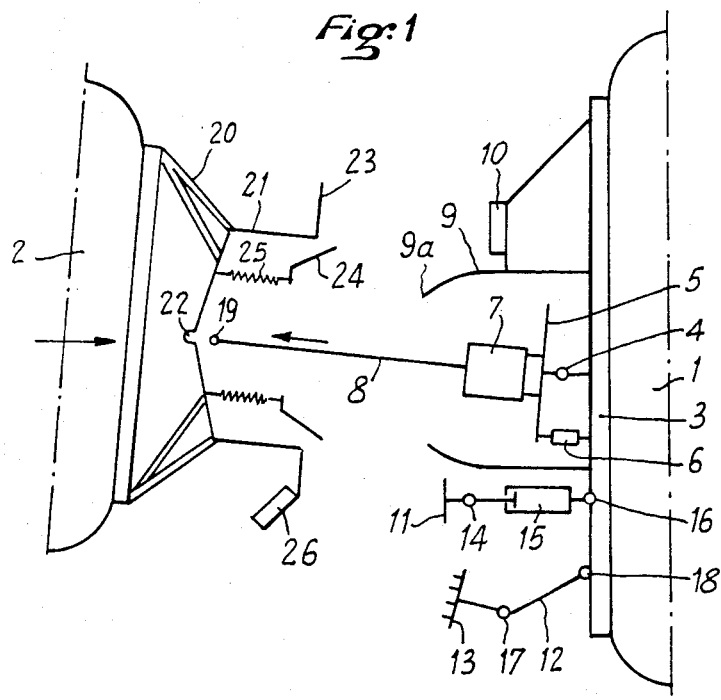

Referring now to the drawings, FIGS. 1 to 4 schematically show the docking and joining mechanism according to the invention and, very partially, two space craft 1 and 2 on which it is mounted. The space craft 1 is for example an orbital station whilst space craft 2 is for example a shuttle.

On craft 1 side, the mechanism according to the invention comprises a base plate 3, with respect to which a steerable plate 5 is articulated due to a central ball and socket joint 4. The plate 5 may be oriented with the aid of an actuator 6 (jack, motor, ... ) abutting on the base plate 3. On the plate 5 is mounted a device 7 in which is stored an extensible boom 8 adapted to be extended and retracted under the action of means contained in said device 7. The plate 5 and the device 7 that it bears are surrounded by an envelope 9 fast with the plate 3 and presenting a spherical male part 9a opposite the plate 3. Around the envelope 9 are provided a plurality of magnetic locks 10 and damper pads 11 (one lock 10 and one damping pad 11 are visible in FIGS. 1 to 4), as well as a rotary arm 12 bearing a device for electrical connection. Each pad 11 is articulated at 14 on a damping device 15, itself articulated at 16 on the base plate 3.

Similarly, the electrical connection device 13 is articulated at 17 on arm 12, itself articulated at 18 on the base plate 3. Finally, at the free end of the boom 8 are provided connecting means 19.

On craft 2 side, the mechanism according to the invention comprises a structure 20 supporting an envelope 21, at the bottom of which are provided connecting means 22 complementary of the connecting means 19 borne by the boom. On the periphery of the outer edge of the envelope 21 is provided a flange 23 adapted to form bearing and cooperation surfaces for the magnetic locks 10 and the damping pads 11 of the craft 1. Finally, inside the envelope 21 is provided a centering cone 24 connected to structure 20 by damping devices 25.

Figure 2:
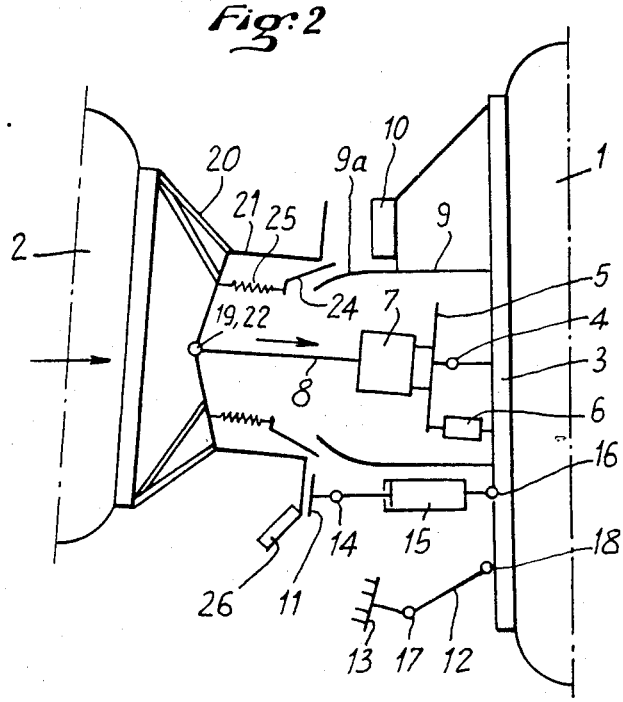
Figure 3:
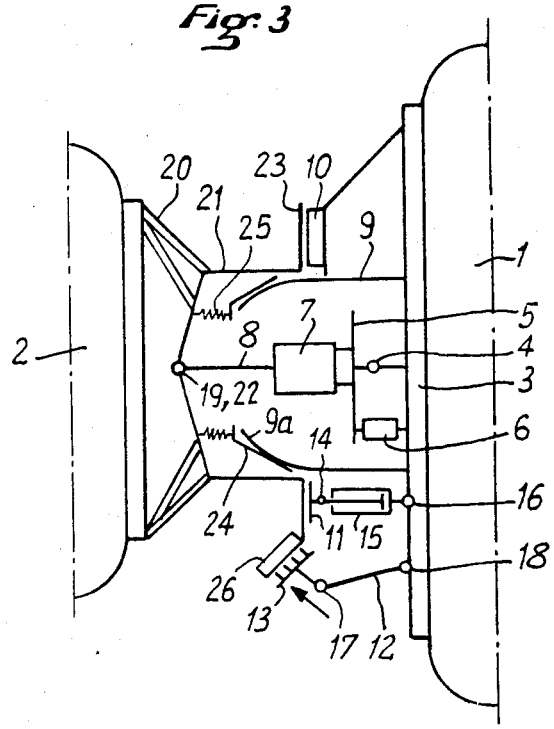
Figure 4:
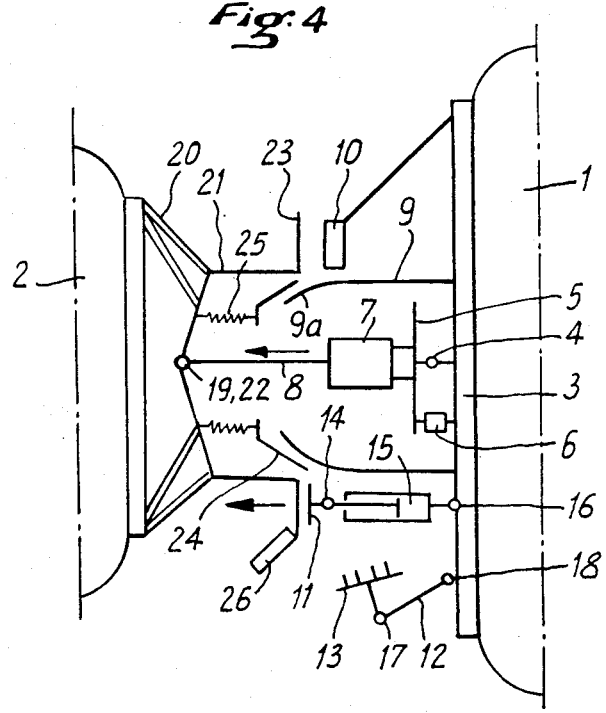

The mechanism according to the invention functions as follows:

When the two craft 1 and 2 are sufficiently close to each other and when it has been decided to dock and join these craft, the device 7 is actuated to extend the boom 8 outwardly, whilst the motor 6 causes the plate 5 to pivot about articulation 4, to compensate for a possible misalignment of the axes of the craft 1 and 2, so that said boom is directed towards the complementary connecting means 22 of the craft 2 (cf. FIG. 1). The boom 8 is extended until the connecting means 19 borne by the end of the boom 8 are in mesh with said complementary connecting means 22. At that moment, the two craft 1 and 2 are therefore still spaced apart from each other, but connected by the telescopic boom 8. The hauling in operation may then commence (cf. FIG. 2). To this end, the boom 8 is retracted so that it hauls (directly or indirectly via a winch whose cable is attached to the end of the boom 8) the craft 2 towards craft 1. It will be noted that, during hauling in, the axes of the craft 1 and 2 possibly remain out of alignment, as shown in FIGS. 1 and 2. In the course of hauling in, the part 9a of the envelope 9 enters in the centering cone 24 so that the two craft align automatically, whilst, with the boom 8 continuing to haul, the centering cone 24 retreats under the thrust of part 9a, compressing the damping devices 25. Moreover, the damping pads 11 abut on the flange 23. At the end of hauling, the damping devices 25 of the centering cone 24 and the dampers 15 of the pads 11 are sufficiently compressed for the magnetic locks 10 to act on the flange 23, so that the two craft are then connected to each other (cf. FIG. 3). The arm 12 is then controlled so that the electrical connecting device 13 plugs into a complementary connecting device 26 borne by the craft 2. The two craft 1 and 2 are then not only mechanically fast but connected electrically.

When the two craft must separate (cf. FIG. 4), the connecting device 13 and 26 are disconnected and the action of the magnetic locks 10 is eliminated, with the result that craft 2 may move away from craft 1 under the action of its own motors, the connecting means 19 and 22 being separated at the latest when the boom 8 reaches its maximum extended length.

In the preferred embodiment of the mechanism according to the invention, shown in FIGS. 5 to 8, the plate 5 is articulated on the plate 3 via, not a simple ball and socket joint 4, but a supple cylinder 27 with perforated walls, as described in U.S. Pat. No. 4,325,586 or in French patent application No. 7905283. The plate 5 is moreover controlled in orientation by a plurality of diametrically opposite motors 6.

Inside the device 7, borne by the plate 5, are provided means 28 for unwinding and winding supple metal bands 29, of the tape measure type, adapted to form, as mentioned hereinabove, a boom of STEM structure. The free end of the boom 8 is fast with a head 30, inside which is provided a damper 31 to which are connected the connecting means 19. Elastic blades 32, adapted to dampen the relative axial movements of the two craft 1 and 2, are disposed between the head 30 and the means 19 and exert an action tending to move said connecting means 19 away from the head 30 (in FIG. 5, however, for reasons of clarity, the means 19 have been shown detached both from the complementary connecting means 22 and from the end of stroke stop of the damper 31).

Inside the boom 8 passes a cable 33 attached at 34 to the head 30 and unwound or wound by an electric winch (not shown to render the drawing clearer) disposed inside the device 7.

Figure 5:
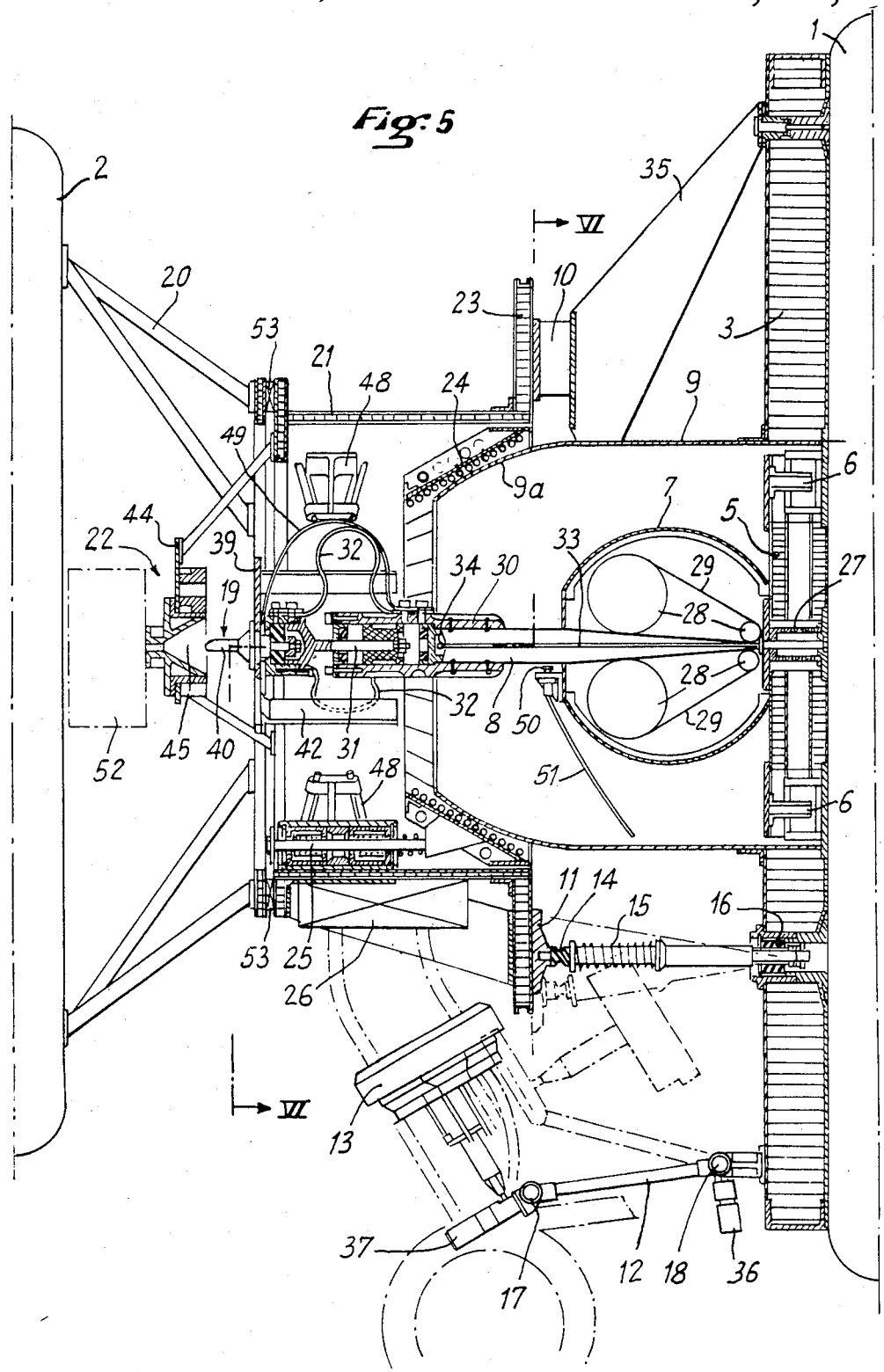
FIG. 5 shows, in axial section along line V—V of FIG. 6, a preferred embodiment of the mechanism according to the invention, when the two space craft are docked on each other, the connecting means of the boom and those of the captured craft being, however, shown separate to render the drawing clearer.
Figure 6:
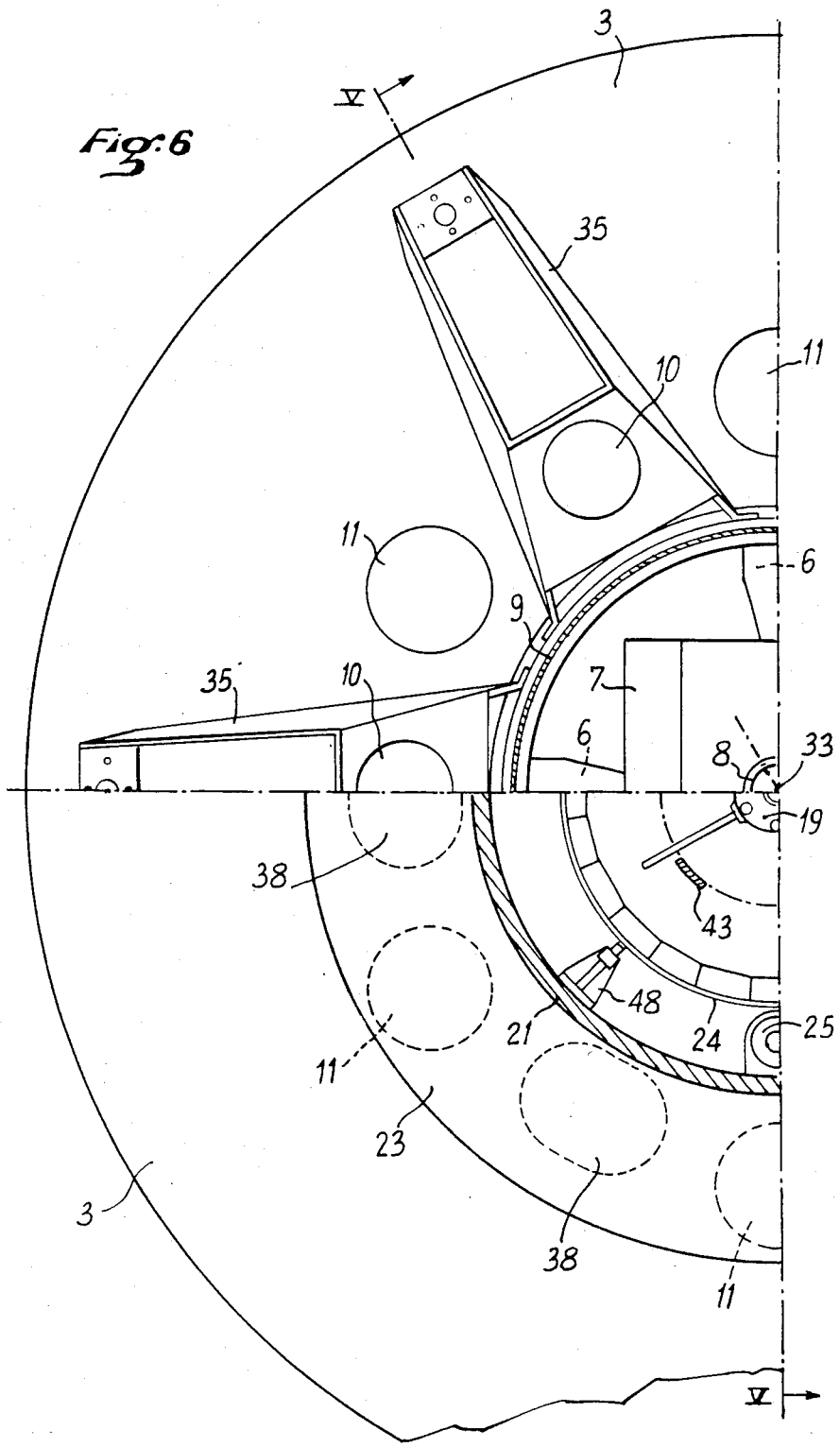
FIG. 6 is a half-section along line VI—VI of FIG. 5.
Figure 7:
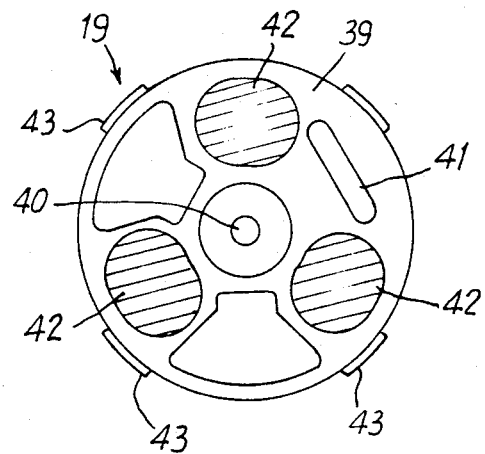
FIG. 7 is a front view of the connecting means borne by the free end of the boom.
Figure 8:
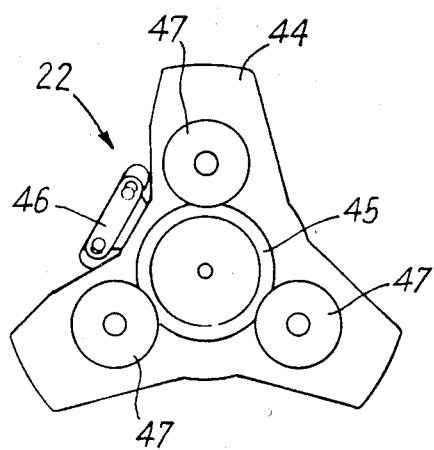
FIG. 8 is a front view of the complementary connecting means provided on the captured craft.

The magnetic locks 10 are borne at the end of arms 35, whilst the ball and socket joints 14 and 16 of the pads 11 are formed by simple rubber blocks. FIG. 5 shows motors 36 and 37, disposed at articulations 17 and 18 of arm 12 and allowing the latter to be controlled. Opposite the locks 10, the flange 23 bears locking plates 38.

The connecting means 19, borne at the end of the boom 8 (cf. also FIG. 7), comprise a locking plate 39 made of soft iron, at the centre of which is mounted a projecting tip 40. The locking plate 39 further bears a reflecting zone 41, magnetic locking zones 42 and reflector sectors 43 (at right angles to said plate). Furthermore, the complementary connecting means 22 (cf. also FIG. 8) comprise an electrically insulated support plate 44, at the centre of which is provided a female conducting cone 45. The support plate 44 further bears a proximity sensor 46 and magnetic locks 47.

Inside the envelope 21 are provided proximity sensors 48 adapted to cooperate with the reflecting sectors 43.

A braided conductor wire 49 ensures electrical continuity between the locking plate 39 and the boom 8, whilst the latter is taken to the same electrical potential as the craft 1 by a sliding contact 50, associated with a conductor 51.

The female centering cone 24 may be of the ball or roller bearing type to facilitate sliding of the male cone 9a.

The functioning of the mechanism of FIGS. 5 to 8 will be explained in greater detail hereinafter, it being assumed that the relative velocity of approach and the relative positions (distance of separation and angular deviations between the orientations) of the two craft are known with sufficient precision (with the aid of pickups and sensors which have not been shown but which are conventional on board space craft), so that, with the boom 8 extending towards the craft 2, the means 19 may engage in the centering cone 24 without touching the walls thereof.

As soon as the free end of the boom 8, having passed through the centering cone 24, penetrates inside the envelope 21, it is situated in the detection zone of the proximity sensors 46 and 48 (cooperation of the latter with the reflecting zones 41 and 42) and the boom may then be controlled from the data on distance furnished by these detectors. Consequently, control of the extension and of the orientation of the boom 8 is then effected with the required precision for the projecting tip 40 of means 19 to be engaged in the female cone 45.

Positioning of the connecting means 19 of the boom 8 with respect to the connecting means 22 of craft 22 is thus ensured and locking may then be effected by cooperation of the magnetic discs 47 and the locking zones 42.

The craft 2 thus being captured, the phase of approach by hauling in then begins, under the action of the cable 33 moved by the electric winch (not shown) contained in device 7.

At the end of the approach phase, the craft 2 comes into contact, by the flange 23 of its envelope 21, with the damping pads 11 which slow down its movement and brake it. The centering cone 24 then comes into contact with the spherical part 9a of the envelope 9 and, under the pulling effort of cable 33, the craft 2 aligns with respect to craft 1.

When the locking position of craft 2 is reached and the pole pieces 38 of flange 23 come into contact with the magnetic discs 10, micro-contacts (not shown) cut off the supply of the electric winch pulling the cable 33 and the two craft 1 and 2 are locked.

It will be noted that, as soon as the projecting tip 40 comes into contact with the centering cone 45, the two craft are at the same electrical potential since they are electrically connected to each other by circuit 45, 40, 49, 8, 50 and 51, provided that cone 45 is electrically connected to the earth of the craft 2.

To avoid the appearance of an electric arc at the moment of contact, resistors may be provided in the electrical path for bringing to the same potential. If the effect of such resistors is insufficient, a device 52 may be provided for projecting a jet of ionized gas to place the tip 40 and the cone 45 at the same potential before the first contact between craft 1 and 2.

After the two craft 1 and 2 have been joined, the plug-in device 12, 17, 18 of connectors 13 and 26 is put into operation by controlling the motors 36 and 37 to establish the electrical connections required between the craft 1 and 2. It will be noted that, in the device shown, the face of the fixed connector 26 to be connected to the mobile connector 13 is parallel to the axis of join and not at right angles thereto as might be expected. In fact, such a lateral connection has proved technologically more advantageous than a frontal connection.

When it is desired to separate the two craft 1 and 2, they are firstly disconnected electrically by retraction of device 12, 17, 18, 36, 37, then the locking effort of the magnetic discs 10 is annulled by furnishing an electrical supply thereto.

It is advantageous not to disconnect means 19 and 22 immediately, but, on the contrary, to control the velocity of separation of craft 2 with the aid of the cable 33 and the electric winch. When the conditions of velocity and distance of separation are satisfied, the locking effect of the magnetic discs 47 is annulled, with the result that the means 19 and 22 separate.

The craft 2 may then move away definitively from the craft 1 with the aid of its motors and the boom 8 and the cable 33 are retracted.

If the two craft cannot be separated by this procedure, for example due to an electrical breakdown, pyrotechnic separating means 53 are provided, intervening between the support structure 20 of the craft 2 and the elements 21, 22, 23, 24 and 25 borne by this structure. In this way, when a separation is obtained by the action of pyrotechnic means 53, the craft 2 may move away with the structure 20, elements 21 to 25 remaining fast with craft 1. These elements 21 to 25 may then possibly be eliminated with the aid of a remote-handling system borne by craft 1.

The mechanism according to the invention, in addition to the objects described above, thus makes it possible to ensure:

in controlled manner, placing the two space craft at the same electrical potential;

certain separation of the two space craft, by a redundancy unlocking means, in order not to compromise the mission;

automatically, the electrical connections between the two craft, and the exchange of the part of the mechanism borne by the captured craft.

What is claimed is:

1. A mechanism for docking and joining space craft comprising:

(a) in a first space craft:
a plate articulated to said first space craft by means equivalent to a ball and socket joint centrally located on said plate for permitting pivoting movement of said plate about its center;
actuating means for pivoting said plate;
a storable tubular extendable boom member formed of supple individually windable metallic bands which cooperate when unwound to form said boom;
boom storage and extension means mounted on said plate for storing said metallic bands and extending them to form said boom;

a first locking element connected to the free end of said boom;

a cable having an end connected to said first locking element and extendable with said boom;

means for retracting said cable; and a first centering element comprising an open first envelope encircling said plate and said boom, the outer edge of said envelope being formed to provide an outwardly convex generally spherical surface; and (b) in a second space craft:

a second locking element mounted on said second space craft and adapted to interlock with said first locking element; and a second centering element encircling said second locking element, said second centering element having an outwardly opening, generally conical surface adapted to mate with the spherical surface of said first envelope.

2. The mechanism of claim 1 wherein at least one of said first and second centering elements is provided with first damping means for damping contact therebetween.

3. The mechanism of claim 2 further including a second open envelope encircling said second centering element, said second envelope having a flange at its outer edge providing a bearing surface;

second damping means on said first space craft adapted to bear against said bearing surface; and locking means carried by each space craft which cooperate to lock the two craft on contact.

4. The mechanism of claim 3 further including proximity sensors located within said second envelope for detecting the free end of said boom.

* * * * *